United States Patent
Colwell et al.

(10) Patent No.: US 10,022,013 B2
(45) Date of Patent: Jul. 17, 2018

(54) SPLASH GUARD SYSTEM

(71) Applicants: George Colwell, Peru, IN (US); William Davis, Peru, IN (US)

(72) Inventors: George Colwell, Peru, IN (US); William Davis, Peru, IN (US)

(*) Notice: Subject to any disclaimer, the term of this patent is extended or adjusted under 35 U.S.C. 154(b) by 305 days.

(21) Appl. No.: 14/940,469

(22) Filed: Nov. 13, 2015

(65) Prior Publication Data
US 2017/0135521 A1 May 18, 2017

(51) Int. Cl.
| A47J 36/06 | (2006.01) |
| F24C 15/12 | (2006.01) |
| F24C 15/36 | (2006.01) |

(52) U.S. Cl.
CPC ............ *A47J 36/06* (2013.01); *F24C 15/12* (2013.01); *F24C 15/36* (2013.01)

(58) Field of Classification Search
CPC .................................. F24C 15/12; F24C 15/14
USPC ........................................ 126/299 C; 99/340
See application file for complete search history.

(56) References Cited

U.S. PATENT DOCUMENTS

| 497,162 A * | 5/1893 | Backman ............... A47J 37/108 |
| | | 126/215 |
| 2,198,158 A * | 4/1940 | Fletcher ................ A47J 37/101 |
| | | 126/299 C |
| 2,797,298 A * | 6/1957 | Fujitani ................. F24C 15/102 |
| | | 126/215 |
| 4,284,058 A | 8/1981 | Lutz |
| 5,033,453 A | 7/1991 | Loyd et al. |
| 5,345,062 A | 9/1994 | Maudal |
| D477,178 S | 7/2003 | Cornfield |
| 7,044,049 B2 | 5/2006 | Johnston, Sr. et al. |
| 2006/0272633 A1 | 12/2006 | Osias, Jr. |
| 2008/0073365 A1 | 3/2008 | Sulosky |
| 2010/0288138 A1 | 11/2010 | Fiorina et al. |

* cited by examiner

*Primary Examiner* — Avinash Savani

(57) ABSTRACT

A splash guard system includes a stove that has a burner. A pot is provided and the pot may contain a liquid. The pot is positioned on the burner such that the pot is in thermal communication with the burner. Thus, the stove heats the liquid. A shield is removably coupled to the pot. The shield inhibits the liquid from splashing onto the burner when the stove heats the liquid.

6 Claims, 3 Drawing Sheets

SPLASH GUARD SYSTEM

BACKGROUND OF THE DISCLOSURE

Field of the Disclosure

The disclosure relates to guard devices and more particularly pertains to a new guard device for blocking a liquid that boils over a pot.

SUMMARY OF THE DISCLOSURE

An embodiment of the disclosure meets the needs presented above by generally comprising a stove that has a burner. A pot is provided and the pot may contain a liquid. The pot is positioned on the burner such that the pot is in thermal communication with the burner. Thus, the stove heats the liquid. A shield is removably coupled to the pot. The shield inhibits the liquid from splashing onto the burner when the stove heats the liquid.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
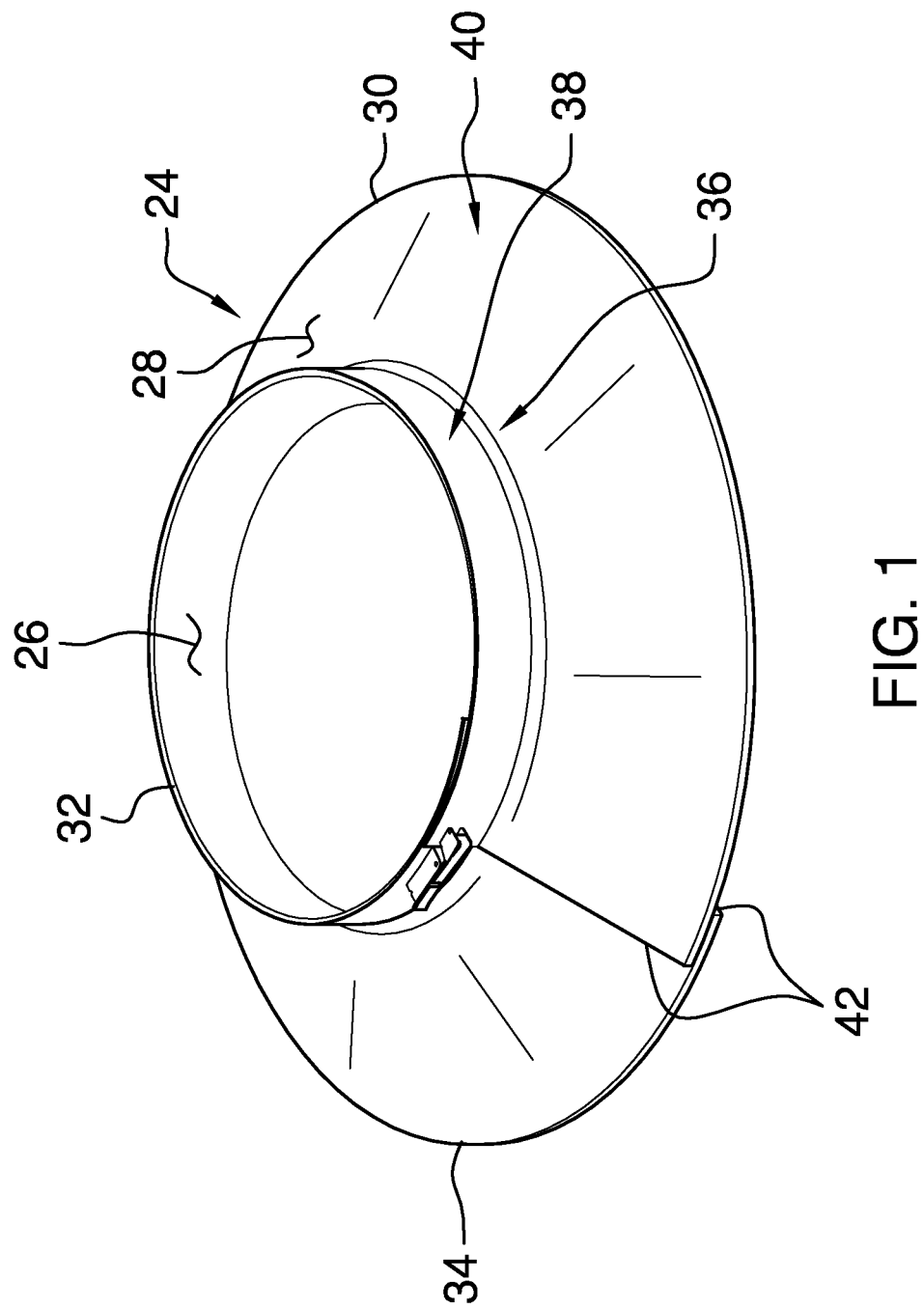
FIG. 1 is a top perspective view of a splash guard system according to an embodiment of the disclosure.
Figure 2:
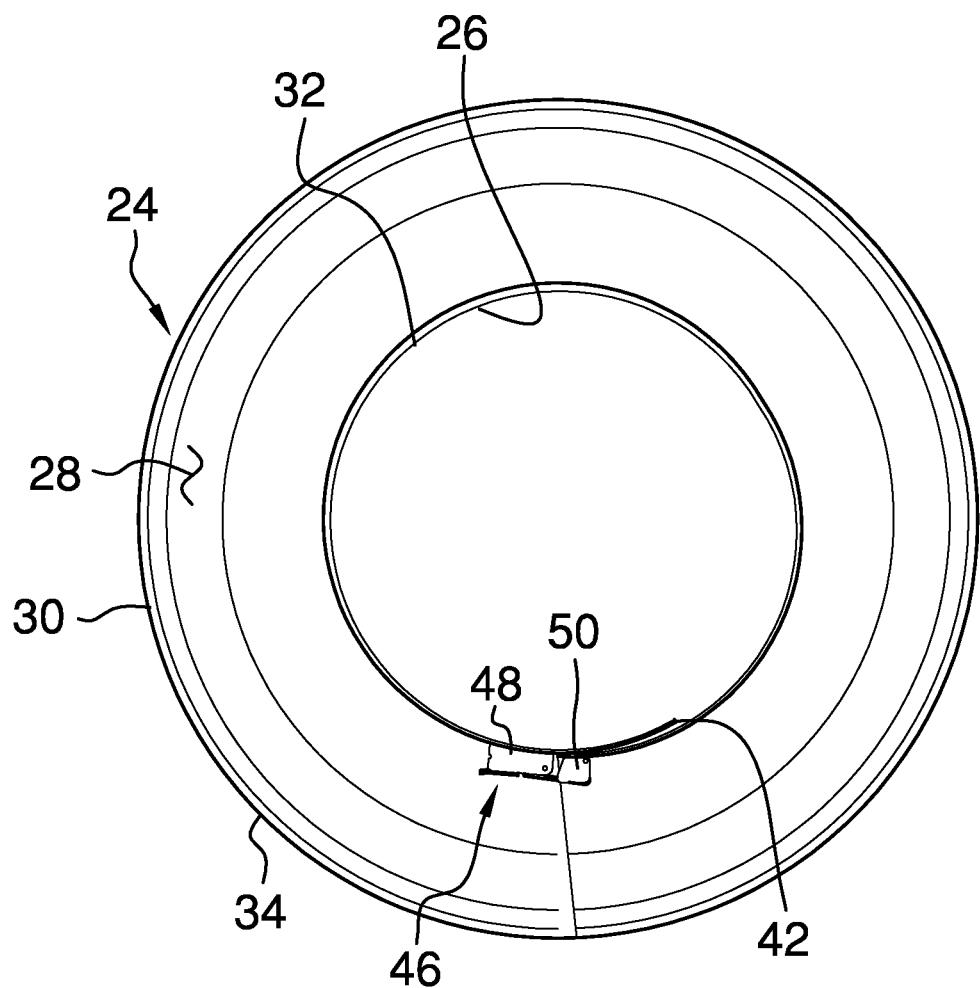
FIG. 2 is a top view of an embodiment of the disclosure.
Figure 3:
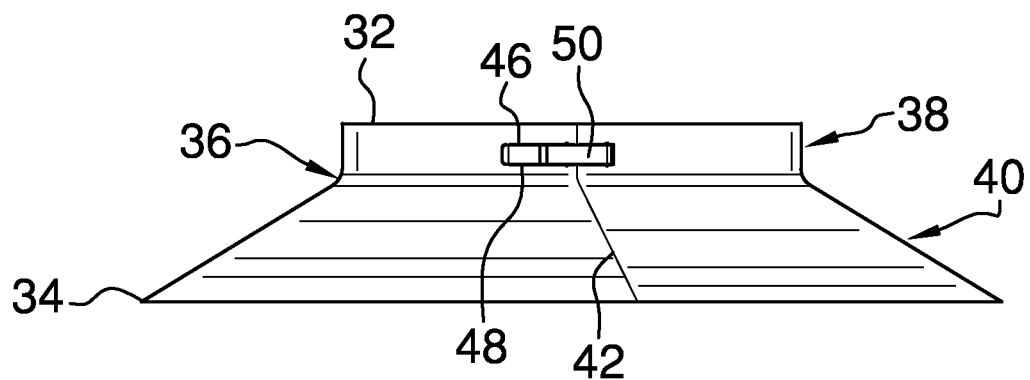
FIG. 3 is a front view of an embodiment of the disclosure.
Figure 4:
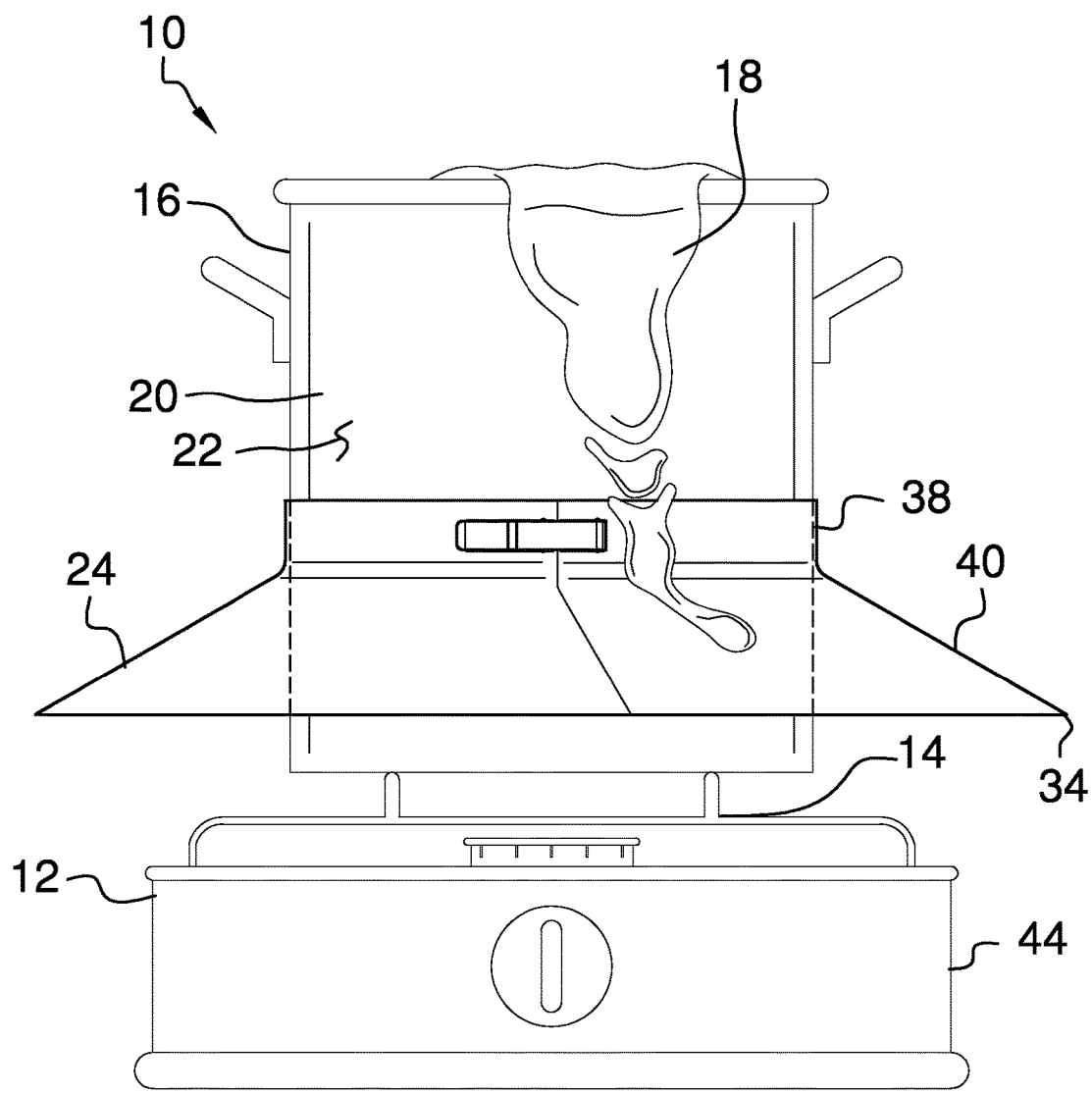
FIG. 4 is a perspective in-use view of an embodiment of the disclosure.

With reference now to the drawings, and in particular to FIGS. 1 through 4 thereof, a new guard device embodying the principles and concepts of an embodiment of the disclosure and generally designated by the reference numeral 10 will be described.

As best illustrated in FIGS. 1 through 4, the splash guard system 10 generally comprises a stove 12 that has a burner 14. The stove 12 may comprise a gas stove or an electric stove. A pot 16 is provided and the pot 16 may contain a liquid 18. The pot 16 is positioned on the burner 14 such that the pot 16 is in thermal communication with the burner 14. Thus, the stove 12 may heat the liquid 18. The pot 16 has an outer wall 20 and the outer wall 20 has an outer surface 22. The pot 16 may comprise a cooking pot of any conventional design and the liquid 18 may comprise a soup or the like.

A shield 24 is removably coupled to the pot 16 and the shield 24 inhibits the liquid 18 from splashing onto the burner 14 when the stove 12 heats the liquid 18. The shield 24 has a first surface 26, a second surface 28 and a peripheral edge 30 extending between the first surface 26 and the second surface 28. The peripheral edge 30 has an inner side 32 and an outer side 34. The shield 24 is continuous such that the shield 24 forms a ring. Thus, the inner side 32 is concentric with respect to the outer side 34. The shield 24 is comprised of a corrosion resistant material such as galvanized steel or the like.

The shield 24 has a bend 36 thereon to define a flange portion 38 and a skirt portion 40 of the shield 24. The bend 36 is positioned closer to the inner side 32 than the outer side 34 and the flange portion 38 is directed upwardly from the skirt portion 40. The shield 24 is split between the inner side 32 and the outer side 34 to define a pair of ends 42 of the shield 24. The shield 24 is positionable around the outer wall 20 of the pot 16. The first surface 26 corresponding to the flange portion 38 abuts the outer surface 22 of the pot 16.

The skirt portion 40 extends outwardly from the outer wall 20 such when the shield 24 is positioned around the pot 16. Thus, the second surface 28 corresponding to the skirt portion 40 captures the liquid 18 when the liquid 18 boils over from the pot 16. The skirt portion 40 angles downwardly between the flange portion 38 and the outer side 34. The outer side 34 of the shield 24 is spaced outwardly from a perimeter 44 of the burner 14 when the pot 16 is positioned on the stove 12. Thus, the shield 24 inhibits the liquid 18 from spilling onto the burner 14 when the liquid 18 boils over from the pot 16.

A latch 46 is coupled to the shield 24 and the latch 46 may be manipulated. The latch 46 is positioned on the second surface 28 corresponding to the flange portion 38. The latch 46 comprises a first half 48 and a second half 50. Each of the first half 48 and the second half 50 is positioned adjacent to an associated one of the ends 42 of the shield 24. The first half 48 selectively engages the second half 50 when the shield 24 is positioned on the pot 16. The first surface 26 corresponding to the flange portion 38 frictionally engages the pot 16. The latch 46 may comprise an adjustable latch thereby facilitating the shield 24 to accommodate a variety of pot diameters.

In use, the shield 24 is placed around the pot 16 when the pot 16 is heating the liquid 18. The shield 24 is positioned at a selected point on the pot 16. The latch 46 is manipulated to tighten the shield 24 around the pot 16. The shield 24 deflects the liquid 18 away from the burner 14 when the liquid 18 boils over from the pot 16. Additionally, the shield 24 inhibits the liquid 18 from spilling onto the stove 12 when the liquid 18 boils over from the pot 16.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A splash guard system comprising:
    a stove having a burner;
    a pot being configured to contain a liquid, said pot being positioned on said burner such that said pot is in thermal communication with said burner wherein said stove is configured to heat the liquid, said pot has an outer wall, said outer wall having an outer surface; and
    a shield being removably coupled to said pot wherein said shield is configured to inhibit the liquid from splashing onto said burner when said stove heats the liquid, said shield has a first surface, a second surface and a peripheral edge extending between said first surface and said second surface, said peripheral edge having an inner side and an outer side, said shield being continuous such that said shield forms a ring having said inner side being concentric with respect to said outer side, said shield having a bend thereon to define a flange portion and a skirt portion of said shield, said bend being positioned closer to said inner side than said outer side, said flange portion being directed upwardly from said skirt portion wherein said first surface coextensive with said flange portion abuts said pot exposing said inner side in an upwardly facing direction.

2. The system according to claim 1, wherein said shield is split between said inner side and said outer side to define a pair of ends of said shield, said shield being positionable around said outer wall of said pot having said first surface corresponding to said flange portion abutting said outer surface of said pot.

3. The system according to claim 1, wherein said skirt portion extends outwardly from said outer wall such when said shield is positioned around said pot wherein said second surface corresponding to said skirt portion is configured to capture the liquid when the liquid boils over from said pot.

4. The system according to claim 1, wherein said outer side is spaced outwardly from a perimeter of said burner when said pot is positioned on said stove wherein said shield is configured to inhibit the liquid from spilling onto said burner when the liquid boils over from said pot.

5. The system according to claim 2, further comprising a latch being coupled to said shield wherein said latch is configured to be manipulated, said latch being positioned on said second surface corresponding to said flange portion, said latch comprising a first half and a second half, each of said first half and said second half being positioned adjacent to an associated one of said ends of said shield, said first half selectively engaging said second half when said shield is positioned on said pot such that said first surface corresponding to said flange portion frictionally engages said pot.

6. A splash guard system comprising:
    a stove having a burner;
    a pot being configured to contain a liquid, said pot being positioned on said burner such that said pot is in thermal communication with said burner wherein said stove is configured to heat the liquid, said pot having an outer wall, said outer wall having an outer surface;
    a shield being removably coupled to said pot wherein said shield is configured to inhibit the liquid from splashing onto said burner when said stove heats the liquid, said shield having a first surface, a second surface and a peripheral edge extending between said first surface and said second surface, said peripheral edge having an inner side and an outer side, said shield being continuous such that said shield forms a ring having said inner side being concentric with respect to said outer side, said shield having a bend thereon to define a flange portion and a skirt portion of said shield, said bend being positioned closer to said inner side than said outer side, said flange portion being directed upwardly from said skirt portion wherein said first surface coextensive with said flange portion abuts said pot exposing said inner side in an upwardly facing direction, said shield being split between said inner side and said outer side to define a pair of ends of said shield, said shield being positionable around said outer wall of said pot having said first surface corresponding to said flange portion abutting said outer surface of said pot, said skirt portion extending outwardly from said outer wall such when said shield is positioned around said pot wherein said second surface corresponding to said skirt portion is configured to capture the liquid when the liquid boils over from said pot, said outer side being spaced outwardly from a perimeter of said burner when said pot is positioned on said stove wherein said shield is configured to inhibit the liquid from spilling onto said burner when the liquid boils over from said pot; and
    a latch being coupled to said shield wherein said latch is configured to be manipulated, said latch being positioned on said second surface corresponding to said flange portion, said latch comprising a first half and a second half, each of said first half and said second half being positioned adjacent to an associated one of said ends of said shield, said first half selectively engaging said second half when said shield is positioned on said pot such that said first surface corresponding to said flange portion frictionally engages said pot.

* * * * *